United States Patent [19]

Uttscheid

[11] Patent Number: 4,610,207
[45] Date of Patent: Sep. 9, 1986

[54] POSITIONING DEVICE FOR THE TROLLEYS OF AN ELECTRIC OVERHEAD TROLLEY CONVEYOR

[76] Inventor: Georg Uttscheid, Rosenheimer Str. 117, 0-8208 Kolbermoor, Fed. Rep. of Germany

[21] Appl. No.: 675,817

[22] Filed: Nov. 28, 1984

[30] Foreign Application Priority Data

Dec. 13, 1983 [DE] Fed. Rep. of Germany ....... 3345039

[51] Int. Cl.⁴ .............................................. B61K 7/16
[52] U.S. Cl. ..................................... 104/256; 188/63; 198/345
[58] Field of Search ............... 104/162, 249, 254, 256; 198/345; 188/42, 63, 82.7, 84

[56] References Cited

U.S. PATENT DOCUMENTS

| | | | |
|---|---|---|---|
| 2,017,392 | 10/1935 | Blake | 104/256 |
| 2,961,973 | 11/1960 | Bozman | 104/162 |
| 3,024,740 | 3/1962 | Peras | 104/162 |
| 3,075,476 | 1/1963 | Penn et al. | 104/256 |
| 3,799,064 | 3/1974 | Kikuchi et al. | 104/256 |
| 4,572,080 | 2/1986 | Williams et al. | 104/256 |

FOREIGN PATENT DOCUMENTS 859757  1/1961  United Kingdom ................ 104/256

Primary Examiner—Robert B. Reeves
Assistant Examiner—Donald T. Hajec
Attorney, Agent, or Firm—Cahill, Sutton & Thomas

[57] ABSTRACT

A positioning device for the trolleys of an electric overhead trolley conveyor is described. This positioning device comprises a carrier which is shiftable in the direction of the movement of the trolley. The carrier is connected with a damping device. Further it comprises an engaging member cooperating with the trolley, whereby the engaging member is rendered inoperative toward the end of the carrier movement. This insures on the one side, that the trolley reaches the defined end position by engaging a stopping member. On the other side it is prevented, that the trolley strikes against the stopping member 40 with a high force of inertia. For enabling a recommenced movement the stopping member 40 may be rendered inoperative. The carrier is preferably utilized for this purpose.

3 Claims, 3 Drawing Figures

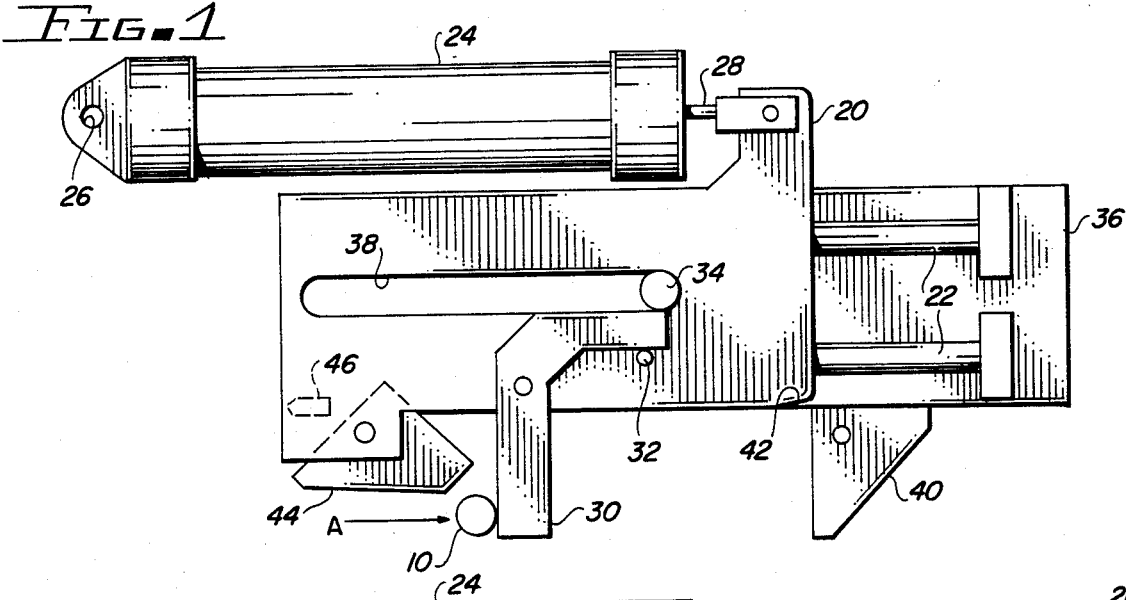
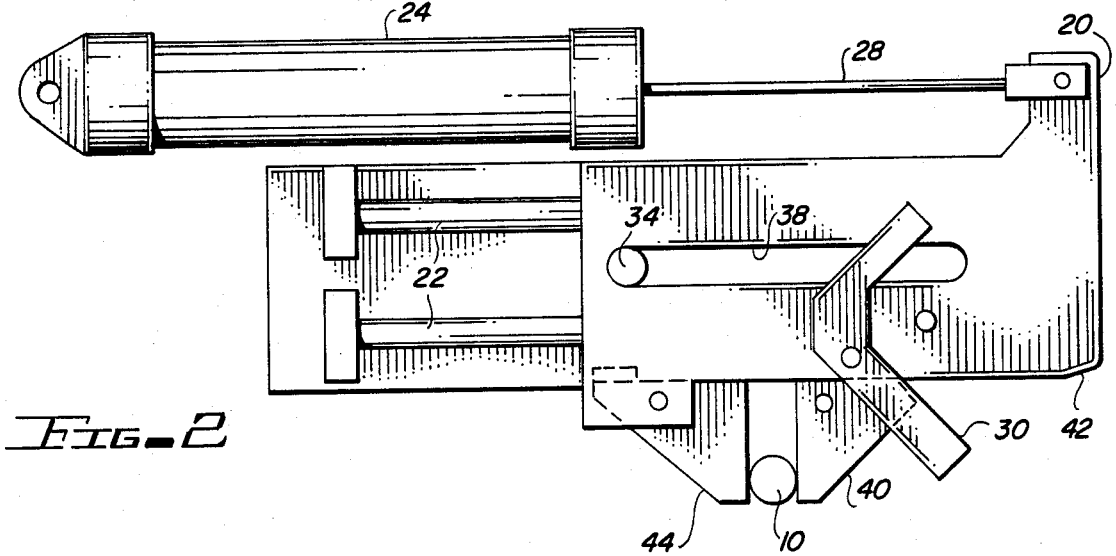
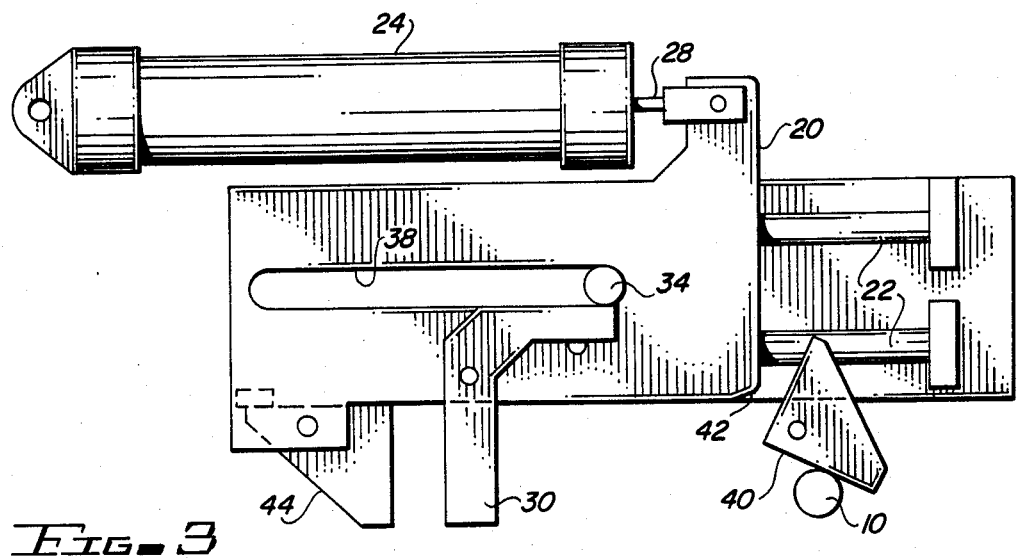

4,610,207

POSITIONING DEVICE FOR THE TROLLEYS OF AN ELECTRIC OVERHEAD TROLLEY CONVEYOR

BACKGROUND OF THE INVENTION

1. Field of the Invention

This invention is concerned with apparatus for stopping movement of an object at a predetermined location.

2. Description of Related Art

Conventional positioning devices of this type are inflicted with a number of problems. The drive motor of the trolley is turned off before the stop position is reached so that the trolley must reach the stop position due to its inertia. However, the suspended loads differ widely. They may reach up to 5 tons. Therefore the positioning device cannot be adjusted optimally. If the adjustment is made so that the trolley with the highest load just about reaches its end position, other trolleys will come to rest before they reach the end position. On the other side, if it is insured that trolleys with a smaller load reach the end position, trolleys with a higher load will suffer severe impact stresses. This will notably lead to impact stresses of the product to be transported, for example an automobile body.

Therefore it is an object of the present invention to provide a positioning device for an electric overhead trolley conveyor whereby the trolleys reach a well-defined precise end position regardless of their mass and without impact stresses and rebound effects.

SUMMARY OF THE INVENTION

This problem is solved by use of a carrier which is engagable by a portion of the trolley and movable from a first position to a second position against the action of a dampling device. An engaging member on the carrier moves out of the path of the trolley as the carrier approaches its second position to allow the carrier to be returned to its first position by the damping means. A stopping member positively stops the trolley at its end position and is then released to permit resumption of movement of the trolley when the carrier moves back to its first position. By these measures the consumption of the kinetic energy of the trolley by the damping device may be distributed over a longer distance so that intolerable impact stresses can be avoided.

The trolley reaches a well-defined end position either by means of the eletric motor which remains operative until the end position is reached. In this case a compensation drive wheel is particularly advantageous. Alternatively the end position can also be reached by means of a damping device which has the additional function of a drive device and which moves the trolley into the well-defined end position by means of a pawl pivotably connected to the carrier. The return movement of the carrier into the starting position may also be effected by the damping device.

BRIEF DESCRIPTION OF THE DRAWING

The invention shall now be explained with reference to drawings.

FIG. 1 shows a schematic representation of a preferred embodiment of the positioning device of the present invention at the initiation of its operation, FIG. 2 shows the positioning device of FIG. 1 in the end position and FIG. 3 shows the positioning device of FIG. 1 after return in the starting position.

DESCRIPTION OF THE PREFERRED EMBODIMENT

The trolley to be positioned is not shown. Merely a positioning pin 10, which is connected with the trolley, is shown. This positioning pin moves together with the trolley in the direction of arrow A. The invention is suitable for any kind of electric overhead trolley conveyors which pose the problem of arresting the trolleys intermittently in precise stop positions, whereafter the movement is to be resumed. The invention is most suitable in connection with an electric overhead trolley conveyor whereby each trolley is equipped with a drive motor and whereby the driving force is transmitted through a drive wheel which rolls on a rail of the conveyor. Optionally a sprocket wheel may additionally be provided for ascending or decending inclined sections. The invention is particularly suitable for an electric overhead trolley conveyor with a drive wheel in accordance with U.S. Pat. No. 4,463,683, to which reference is made for disclosure purposes. This drive wheel is subdivided with an inner drive wheel body and an outer drive wheel ring with an intermediate ring of plastic or bearing material for a frictional transmission of the drive force. The advantages of such a drive wheel in connection with the present invention shall be explained in more detail below.

The positioning device comprises a carrier 20, which is moveable in the direction of arrow A, i.e. in the direction of the movement of the trolleys of the trolley conveyor. For this purpose the carrier 20 is supported in the usual manner by means of slide bearings (not shown) on stationary guide rods 22. The length of the guide rods 22 and hence also the length of the slide movement of the carrier 20 may be freely chosen depending upon the conditions of the electric trolley conveyor. A pneumatic or hydraulic damping cylinder 24 is pivotably connected to a stationary part as position 26. It comprises a piston rod 28 which is pivotably connected to the carrier 20. The damping effect of the cylinder 24 is adjustable by means of a throttle valve (not shown). Depending upon the desired length of the slide movement of the carrier 20 the damping cylinder can have any desired length so that the damping effect can stretch over any desired distance. The control of the damping cylinder can be chosen such, that in the course of this shifting movement from the starting position of the carrier to its end position, in which the trolley comes to rest, the damping characteristic changes stepwise by a successive actuation of throttle valves. Also a gradual change is possible. The significance of such a measure shall be explained further below.

An engaging member 30 is pivotably connected to the carrier 20. It has the shape of a double-armed elbow lever. A stopper pin 32 connected to the carrier prevents the engaging member 30 from turning due to the force of gravity in the clockwise direction out of the position shown in FIG. 1. In the starting position of the carrier 20 shown in FIG. 1 a rotation of the engaging member 30 in the counter-clockwise direction is prevented by a locking member 34. It is provided as a stationary pin which extends from a stationary part 36 of the positioning device through an elongated slot 38 of the carrier 20. This elongated slot 38 defines in cooperation with the locking member 34 the length of the slide movement of the carrier 20. Thus, FIGS. 1, 2 and 3 show the end positions of the carrier. In the position shown in FIG. 1 the engaging member 30 is rigidly locked. This locked position remains as long as the locking member 34 engages the upper arm of the engaging member 30. In the position shown in FIG. 2 this is not any longer the case, so that the engaging member 30 has no function and may freely rotate in the counter-clockwise direction as indicated by the pivoted position in FIG. 2. In the position shown in FIG. 1 the lower arm of the engaging member 30 has the effect of a stopper for the pin 10 of the trolley.

The end position of the trolley is defined by a stopping member 40 which is pivotably connected to a stationary part in such a fashion, that its position may be adjusted in the direction of the movement of the trolley. In the situation shown in FIG. 1 the stopping member 40 is not locked. As soon as the carrier 20 is moved in the direction of arrow A toward the right its lower slightly inclined surface 42 rides onto the stopping member 40 so that it is locked. This situation is shown in FIG. 2. For this purpose the carrier 20 and the stopping member 40 must lie at least partially within the same plane. Further an engaging pawl 44 is pivotably connected to the carrier 20. Normally this engaging pawl 44 rests by its own weight against a projection 46 of the carrier 20 in the position shown in FIG. 3. The engaging pawl can therefore be pivoted from this position in the counter-clockwise direction. Such a pivoting position is shown in FIG. 1. This pivoting motion is effected by the pin 10 of the trolley moving in the direction of arrow A.

Now the operation of the positioning device shall be explained with reference to different modes of operation. These different modes of operation are distinguished among other things by different constructions and controls of the damping cylinder 24.

In the first mode of operation the trolley moves by virtue of its own motor drive until it reaches the end position defined by the stopping member 40. Therefore the cylinder 24 serves solely as damping cylinder. The trolley moves together with its load with a velocity of about 20 m/min. It must come to rest precisely in the position defined by the stopping member 40. The desired position is previously adjusted by setting the stopping member 40. Also the damping effect of cylinder 24 is previously adjusted by means of a throttle valve. The pin 10 of the trolley engages the engaging pawl 44 which gives way in the counter-clockwise direction. Thereafter the pin 10 engages the engaging member 30. Since it is locked by the locking member 34 it cannot give way by a pivoting motion. Therefore the electric motor of the trolley moves not only the trolley and its load but also the carrier 20. The damping cylinder 24 counteracts this movement, which means, that the velocity with which the trolley can be moved forward by means of the electric motor is determined by the setting of the throttle valve (not shown) of the cylinder 24. The trolley moves together with its load with a reduced velocity of for example 5 m/min until the pin 10 engages the stopping member 40. Since the moment of inertia is already reduced due to the effect of the damping cylinder 24 the trolley comes to rest precisely in the desired end position. It does not bounce back. It neither comes to rest in an earler position since the motor drive remains operative until the end position is reached. With such a mode of operation it is desirable to choose the cooperation between the engaging member 30 and the locking member 34 in such a fashion, that this cooperation is terminated shortly before the end position. In case of a heavier load a longer damping path is necessary for reducing the velocity of the trolley. This does not pose any problems is connection with the described embodiment since the length of the movement of carrier 20 and the damping path of the cylinder 24 may have any value. In a modified embodiment the throttle valve may be chosen such, that it is changed from the full opening state into the closed state during the movement of the carrier into the end position either step-wise or step-less by means of a position control by carrier 20. In this fashion the damping effect is gradually or successively increased. In case of a step-wise change of the damping effect the trolley velocity may be reduced first from 20 m/min. to 10 m/min and thereafter in a second lowering stage down to 5 m/min.

As soon as the trolley has reached its end position the motor is turned off. Thereafter the necessary manipulations may be effected at the load in the precise end position. As soon as the load is to be advanced again the carrier 20 is returned opposite to the direction of arrow A. For this purpose damping cylinder 24 is used. It is merely necessary to use a control device which allows the cylinder 24 to be impressed with pressurized air. During the return movement of carrier 20 the engaging member 30 is locked again by locking member 34 while the stopping member 40 is unlocked. Now the motor of the trolley may be turned on again. The movement of the trolley is not any longer prevented by the stopping member 40 since it may be pivoted in accordance with FIG. 3 by means of the pin 10 in the counter-clockwise direction. For this mode of operation the use of a compensation drive wheel in accordance with U.S. Pat. No. 4,463,683 is advantageous since it allows to compensate for the difference between the velocity of movement of the trolley determined by the damping cylinder and the still high and continuous drive velocity of the electric motor of the trolley. Further such a compensation drive wheel is advantageous for the commencement of the movement, notably if the load is high. It prevents a jerky movement. Further the use of such a compensation drive wheel is advantageous for the other modes of operation to be described next. In these modes of operation the electric motor is turned off before the trolley reaches the end position defined by the stopping member 40. After the electric motor has been turned off the movement of the trolley is maintained for a while due to the movement of inertia. Thereafter the movement of the trolley is effected by an actuation of the damping cylinder which is impressed with a pressurized fluid. In this mode of operation the pin 10 engages first the engaging pawl 44 which gives way by pivoting in the counter-clockwise direction. Thereafter the engaging pawl 44 returns again into the position shown in FIG. 3 behind pin 10. The electric motor may have already been turned off previously or it may be turned off now. Depending upon the weight of the load the trolley has a considerable inertia. In view of this inertia the carrier 20 is moved by engagement of the pin with the engaging member 30 in the direction of arrow A against the force of the damping cylinder 24. This leads to a breaking of the movement of the trolley and its load. In some cases the movement of inertia is sufficient for moving the trolley and the carrier 20 into the end position defined by the stopping member 40. If the load is smaller, the movement of inertia is not sufficient. Therefore the damping cylinder 24 has the additional function of an actuation cylinder. By impressing the damping cylinder 24 with a pressurized fluid the carrier 20 may be moved further toward the right side. Now the engaging pawl 44 becomes operative. It engages the pin 10 of the carrier and brings the carrier into the precisely defined end position shown in FIG. 2. The next steps of operation correspond to the previously described mode of operation.

In all modes of operation the engaging pawl 44 has the function of preventing a rebound effect of the trolley additionally to the transport function. Numerous modifications of the device are possible. Notably the stopping member 40 may be fixed by a separately actuatable locking element instead of the locking by the carrier 20. The stopping member 40 can of course also be shiftably mounted or it may be pivoted about a different axis. The same holds for the engaging member 30 and for the engaging pawl 44. The shown embodiment is particularly simple since the damping cylinder can have three functions and since the carrier movement leads automatically to the locking and unlocking of the stopping member 40 and of the engaging member 30.

I claim:

1. A positioning device for stopping movement of an object at a predetermined location comprising a carrier positioned near the path of movement of said object, means supporting said carrier for movement between first and second positions, damping means for resisting movement of said carrier from its first position to its second position and for returning said carrier from its second position to its first position, an engaging member mounted on said carrier for movement between an engaging position in which it is in the path of movement of the object and a free position in which it is out of the path of movement of the object, means for releasably locking said engaging member in its engaging position when said carrier is in its first position whereby said object engages the engaging member and moves said carrier toward its second position against the resistance of said damping means, said releasable locking means releasing said engaging member to permit movement to its free position as the carrier approaches its second position whereby said carrier is permitted to be returned to its first position by said damping means, a stopping member positioned in the path of movement of said object at the predetermined location, said stopping member being movable out of the path of movement of said object to allow movement of the object to be resumed, and means associated with said carrier for preventing movement of said stopping member out of the path of said object except when said carrier is near its first position.

2. The positioning device of claim 1 further comprising a movable pawl carried by said carrier and positioned in the path of movement of said object ahead of said engaging member, said pawl permitting free movement of said object past the pawl toward said engaging member, but preventing reverse movement of said object.

3. The positioning device of claim 1 wherein said engaging member is a double-armed elbow lever pivotally mounted on said carrier and the means for releasably locking said engaging member comprises a stationary pin positioned to engage one of the arms of the engaging member.

* * * * *